(12) United States Patent
Koga

(10) Patent No.: US 8,898,490 B2
(45) Date of Patent: Nov. 25, 2014

(54) INFORMATION PROCESSING APPARATUS, CONTROL METHOD THEREFORE, AND STORAGE MEDIUM

(75) Inventor: Kazuhiro Koga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

(21) Appl. No.: 13/407,235

(22) Filed: Feb. 28, 2012

(65) Prior Publication Data

US 2012/0246502 A1 Sep. 27, 2012

(30) Foreign Application Priority Data

Mar. 23, 2011 (JP) ................... 2011-064826

(51) Int. Cl.
| | | |
|---|---|---|
| *G06F 1/32* | (2006.01) | |
| *G06F 3/12* | (2006.01) | |
| *H04N 1/32* | (2006.01) | |
| *H04N 1/00* | (2006.01) | |

(52) U.S. Cl.
CPC .......... *H04N 1/00896* (2013.01); *G06F 3/1221* (2013.01); *Y02B 60/1271* (2013.01); *G06F 3/1267* (2013.01); *H04N 2201/0094* (2013.01); *H04N 1/32106* (2013.01); *H04N 1/00832* (2013.01); *G06F 3/1285* (2013.01); *H04N 2201/3276* (2013.01)
USPC ........... 713/300; 713/310; 713/320; 713/321; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS

| | | | | | |
|---|---|---|---|---|---|
| 6,041,382 | A | * | 3/2000 | Hirano ........................... | 710/316 |
| 7,800,772 | B2 | * | 9/2010 | Hamada ........................ | 358/1.15 |
| 8,547,567 | B2 | * | 10/2013 | Manabe ........................ | 358/1.14 |
| 2002/0196459 | A1 | * | 12/2002 | Kadowaki .................... | 358/1.14 |
| 2005/0128515 | A1 | | 6/2005 | Ohno | |
| 2009/0051958 | A1 | * | 2/2009 | Ito ................................ | 358/1.14 |

FOREIGN PATENT DOCUMENTS

JP 2005-196741 A 7/2005

* cited by examiner

*Primary Examiner* — M Elamin
(74) *Attorney, Agent, or Firm* — Fitzpatrick, Cella, Harper & Scinto

(57) ABSTRACT

The information processing apparatus generates and notifies, in the first power state, a prohibition condition for prohibiting the information processing apparatus from returning to the first power state even if an interface unit has received data from an external apparatus in the second power state and the received data matches a return condition for causing the information processing apparatus to return from the second power state to the first power state. When data is received from the external apparatus in the second power state, if the received data matches the prohibition condition, the interface unit does not transmit a return command to the power control unit, and if the received data does not match the prohibition condition, the interface unit transmits the return command to the power control unit.

9 Claims, 9 Drawing Sheets

F I G. 5

| Section ID | Copy Limit Count | Print Limit Count | Color Job | Single Side Job | Not N in 1 Job | Clear Timing |
|---|---|---|---|---|---|---|
| 1 | No Limit | No Limit | No Limit | Prohibit | Prohibit | Sunday AM00:00 |
| 2 | 2000/week | 2000/week | 1000/week | Permit | Permit | Sunday AM00:00 |
| 3 | 1000/week | 5000/week | 0(Prohibit) | Permit | Permit | Sunday AM00:00 |
| 4 | 1000/week | 3000/week | Permit | Permit | Permit | Sunday AM00:00 |
| 9999 | 300/week | 300/week | No Limit | Permit | Permit | Sunday AM00:00 |

F I G. 6

| Section ID | Color Copy | Mono Copy | Color Print | Mono Print |
|---|---|---|---|---|
| 1 | 534 | 1254 | 879 | 2034 |
| 2 | 106 | 672 | 844 | 1156 |
| 3 | 325 | 1284 | 0 | 547 |
| 4 | 98 | 820 | 52 | 325 |
| 9999 | 23 | 47 | 105 | 193 |

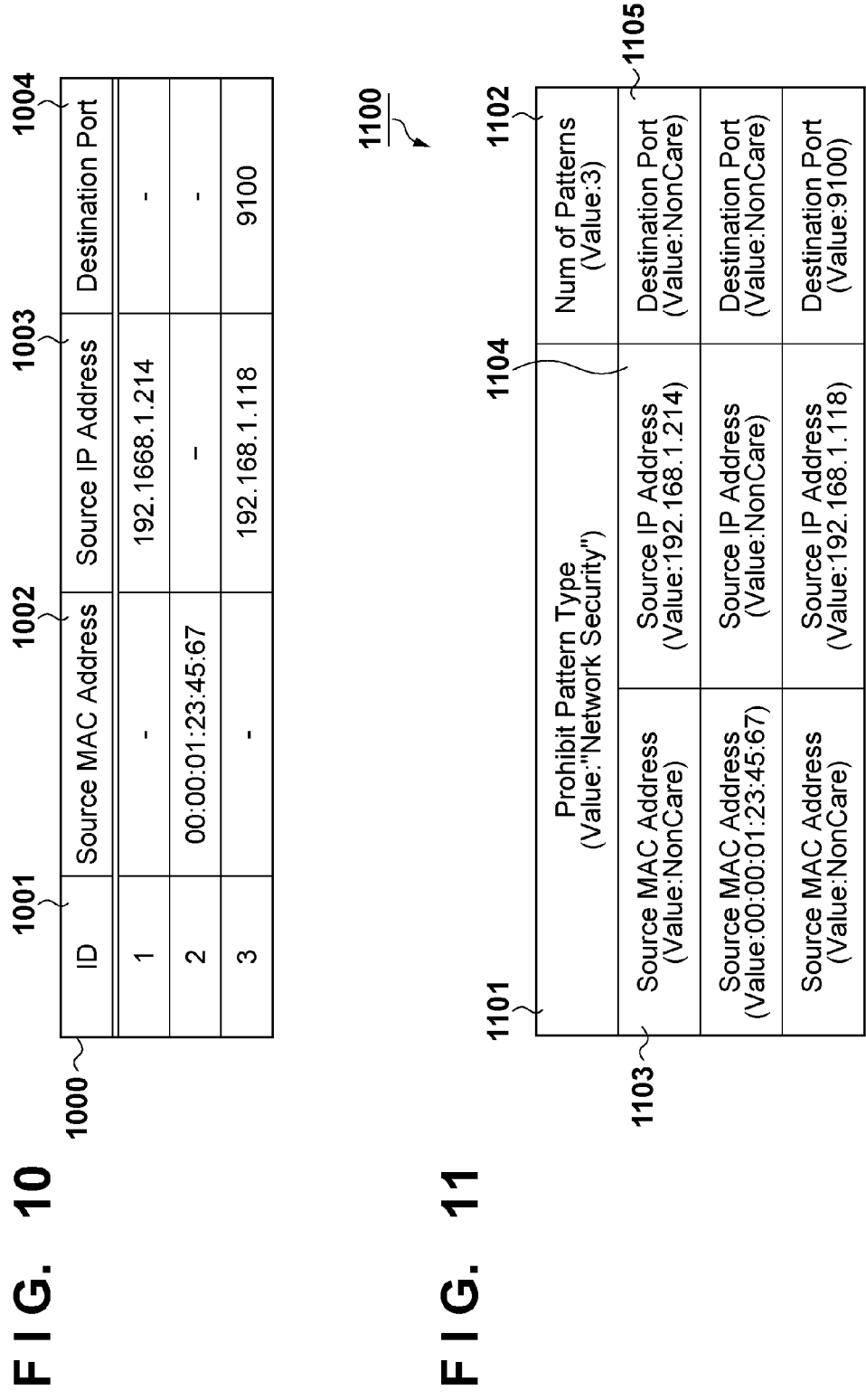

INFORMATION PROCESSING APPARATUS, CONTROL METHOD THEREFORE, AND STORAGE MEDIUM

BACKGROUND OF THE INVENTION

1. Field of the Invention

The present invention relates to an information processing apparatus, a control method therefor, and a storage medium.

2. Description of the Related Arts

As an example of image forming apparatuses such as a multifunctional peripheral and a single-function printer, an image forming apparatus having a sleep mode (power saving mode) in which power consumption is lower than in a standby state (normal power mode) has been proposed. In the sleep mode, power supply to units other than a random access memory (RAM), a network interface card (NIC), and an operation unit of the image forming apparatus is stopped in order to save power consumption during sleep. That is, image forming processing cannot be executed in the sleep mode, because power supply to a photosensitive drum and a fixing device provided in a printer unit of the image forming apparatus and also the central processing unit (CPU) and the hard disk drive (HDD) is stopped.

If a predetermined condition is satisfied during the sleep mode, the image forming apparatus returns from the sleep mode to the standby state. Examples of predetermined conditions include the case where a user has performed an operation on the operation unit of the image forming apparatus, and the case where a network interface apparatus has received a packet that meets a condition for returning from the sleep mode, from a network. For this reason, even during the sleep mode, power is being supplied to the operation unit and the NIC, and the press of a button provided in the operation unit, the reception of a packet or the like is being monitored. For example, Japanese Patent Laid-Open No. 2005-196741 proposes a technique in which, upon receiving a specific wake-up packet, the NIC of the image forming apparatus causes the apparatus body to return from the sleep mode and transmits a subsequently received job to the apparatus body.

However, such a conventional technique has the following problems. With the invention disclosed in Japanese Patent Laid-Open No. 2005-196741, the network interface apparatus that received a job causes the image forming apparatus to return from the power saving mode to the standby state, even if the received job is prohibited from being executed by the image forming apparatus. The reason for this is because the network interface apparatus is unable to determine whether or not the received job is a target that is prohibited from being executed. In other words, for example, if an image forming job is input via a network after transition to the sleep mode, it cannot be determined in the sleep mode whether or not that job is a target that is prohibited from undergoing image forming operations, and the image forming apparatus needs to be waked up into the standby state. In such a case, for example where the input image forming job is determined after wake-up, as a target that is prohibited from undergoing image forming operations, that image forming job is not executed, and the wake-up will have been unnecessary.

SUMMARY OF THE INVENTION

The present invention enables realization of an information processing apparatus that reduces the number of unnecessary returns from the power saving state, a control method therefor, and storage medium.

One aspect of the present invention provides an information processing apparatus comprising an interface unit that controls communication with an external apparatus and having a first power state and a second power state in which power consumption is lower than in the first power state and power is supplied to at least the interface unit, the apparatus comprising: a generation unit that generates, in the first power state, a prohibition condition for prohibiting the information processing apparatus from returning from the second power state to the first power state even if the interface unit receives data from the external apparatus in the second power state and the received data matches a return condition for causing the information processing apparatus to return from the second power state to the first power state; a notification unit that notifies, in the first power state, the interface unit of the prohibition condition generated by the generation unit; and a power control unit that, upon receiving a return command indicating a return from the second power state to the first power state from the interface unit after the information processing apparatus transits from the first power state to the second power state, causes the information processing apparatus to return from the second power state to the first power state, wherein in a case where data is received from the external apparatus in the second power state and the received data matches the return condition, if the received data matches the prohibition condition, the interface unit does not transmit the return command to the power control unit, and if the received data does not match the return condition, the interface unit transmits the return command to the power control unit.

Another aspect of the present invention provides a method for controlling an information processing apparatus comprising an interface unit that controls communication with an external apparatus and having a first power state, and a second power state in which power consumption is lower than in the first power state and power is supplied to at least the interface unit, the method comprising: generating, in the first power state, a prohibition condition for prohibiting the information processing apparatus from returning from the second power state to the first power state even if the interface unit receives data from the external apparatus in the second power state and the received data matches a return condition for causing the information processing apparatus to return from the second power state to the first power state; notifying, in the first power state, the interface unit of the prohibition condition generated in the generation step; transmitting, in a case where data is received from the external apparatus in the second power state, and the received data matches the return condition and does not match the prohibition condition, from the interface unit a return command indicating a return from the second power state to the first power state; upon receiving the return command from the interface unit, causing the information processing apparatus to return from the second power state to the first power state, wherein in a case where data is received from the external apparatus in the second power state, and the received data matches the return condition and the prohibition condition, the interface unit does not transmit the return command to the power control unit.

Further features of the present invention will be apparent from the following description of exemplary embodiments with reference to the attached drawings.

BRIEF DESCRIPTION OF THE DRAWINGS

FIG. 5 shows an example of department-management setting information according to a first embodiment.

FIG. 6 shows an example of department counter information according to the first embodiment.

FIG. 10 shows an example of security management information according to a second embodiment.

FIG. 11 shows an example of a sleep-mode wake-up prohibition condition table for security management according to the second embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Communication System

Hereinafter, a first embodiment of the present invention will be described with reference to FIGS. 1 to 9. While the following description takes the example of using an image forming system as an information processing apparatus, the information processing apparatus may be an apparatus other than the image forming system. First, an exemplary configuration of a communication system including the image forming system of the first embodiment will be described with reference to FIG. 1.

Figure 1:
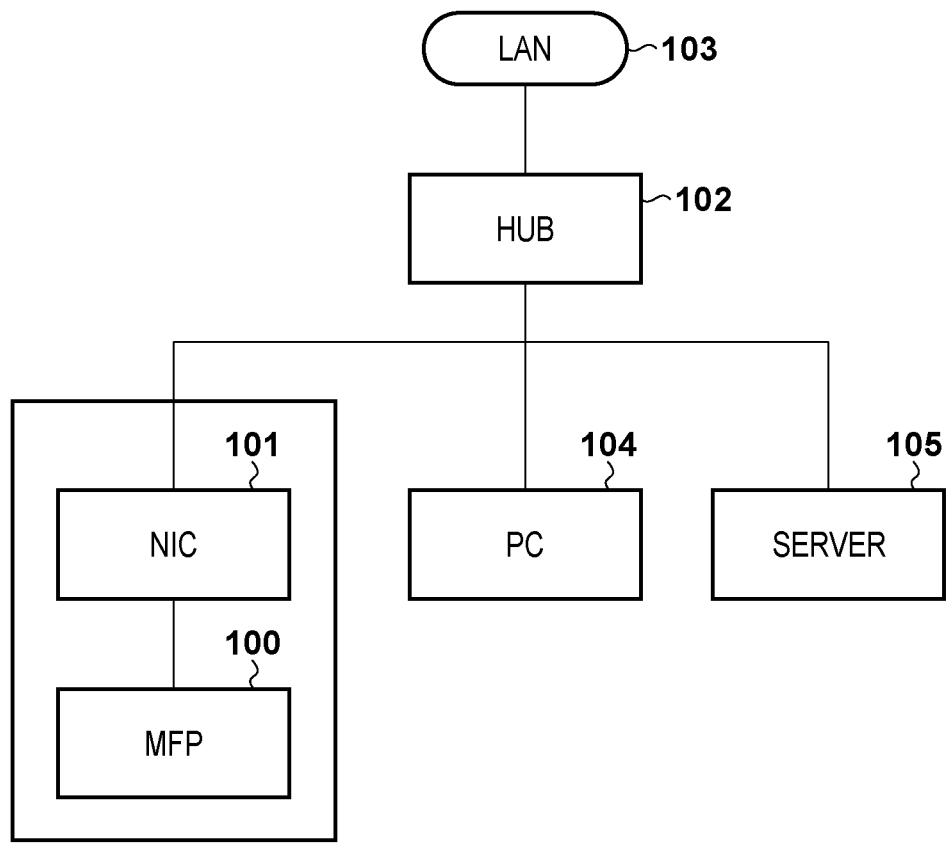
FIG. 1 is a block diagram showing an exemplary configuration of a communication system.

In the communication system shown in FIG. 1, a multi-function peripheral (MFP) 100 is connected to a HUB 102 via a network interface apparatus 101 (network interface card (NIC)). The HUB 102 is further connected to a local-area network (LAN) 103. Note that, in addition to the NIC 101, a PC 104 and a server 105 are also connected to the HUB 102. The HUB 102 is a line concentrator such as an Ethernet (registered trademark). In other words, the MFP 100 is connected to external apparatuses such as the PC 104 and the server 105 via the NIC 101.

Configuration of Image Forming System

Figure 2:
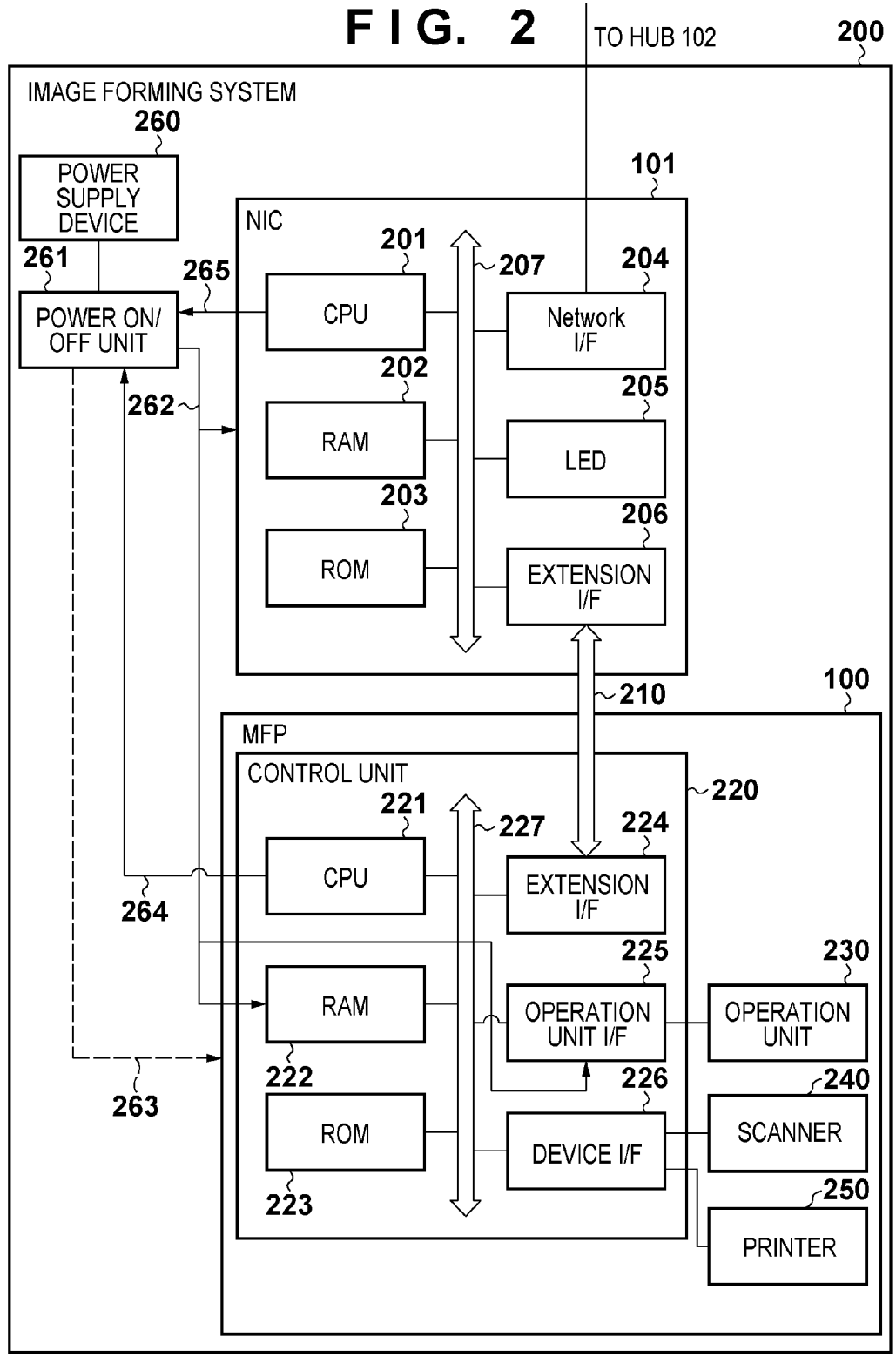
FIG. 2 is a block diagram illustrating an exemplary configuration of an image forming apparatus 200.

Next, an exemplary configuration of an image forming system 200 that includes the MFP 100 and the NIC 101 will be described with reference to FIG. 2. The NIC 101 is a network interface apparatus implemented by an intelligent network card module and removable from the MFP 100. The NIC 101 includes a CPU 201, a RAM 202, a ROM 203, a network I/F 204, an LED 205, and an extension I/F 206, all of which are for the NIC 101, and a system bus 207 connecting these constituent elements with one another.

The CPU 201 executes various types of control processing by reading out control programs stored in the ROM 203. For example, the CPU 201 is connected to the HUB 102 via the network I/F 204 connected to the system bus 207, and further via the HUB 102, executes processing for communicating with a terminal on the LAN 103 in accordance with a predetermined communication protocol. Through this, for example, the CPU 201 receives various types of data such as print data transmitted from a print-data generation apparatus on the LAN 103 or printer control instructions, and transfers the received data to the MFP 100 via the extension I/F 206. Thereafter, print processing or the like is executed by the MFP 100.

The RAM 202 is used as a temporary storage area such as the main memory or work area for the CPU 201. The LED 205 is used as a display unit that indicates the operating state of the NIC 101. The LED 205 indicates, for example, various operating states such as the electrical connection state of the network I/F 204 and the HUB 102 and the communication mode by the colors or flashing patterns of LEDs. The extension I/F 206 is an interface for connecting the NIC 101 and the MFP 100, and is connected to an extension I/F 224 on the MFP 100 side via a local cable 210. Note that the extension I/F 206 is configured so as to include a connector not shown. This connector enables the NIC 101 to be removable from the MFP 100 and also enables the NIC 101 to be mounted on other MFPs having the same configuration.

Meanwhile, the MFP 100 includes a control unit 220, an operation unit 230, a scanner 240, and a printer 250. The control unit 220 includes a CPU 221, a RAM 222, a ROM 223, the extension I/F 224, an operation unit I/F 225, and a device I/F 226, all of which are for the MFP 100, and a system bus 227 connecting these constituent elements with one another. The CPU 221 executes various types of control processing by reading out control programs stored in the ROM 223. For example, the CPU 221 generates output image data based on print data transferred from the NIC 101 via the extension I/F 224, and outputs the output image data to the printer 250 via the device I/F 226.

The RAM 222 functions as the main memory, work area or the like for the CPU 221. The RAM 222 is also configured so as to be capable of expanding the memory capacity through an optional RAM connected to an expansion port not shown. The operation unit 230 is provided with buttons used for performing operations such as setting the operation mode or the like of the MFP 100 or cancelling print data, and a display unit such as a liquid crystal panel or an LED that indicates the operating state of the MFP 100. The printer 250 is a printer using known printing technology, and executes image data printing using, for example, an electrophotographic system (laser beam system), an inkjet system, or a sublimation (thermal transfer) system. The scanner 240 generates image data by reading an image on an original and input that image data to the MFP 100.

Note that the MFP 100 has a sleep mode (power saving mode) in which power consumption is lower than in a standby state (normal power mode). A power supply device 260 is a device for supplying power to the MFP 100 and the NIC 101, and power is supplied via a power ON/OFF unit 261 to power supply lines 262 and 263. When transitioning to the sleep mode, the CPU 221 of the MFP 100 gives a normal power-off instruction to the power ON/OFF unit 261 using a power control signal 264, and thereby cuts off power supply to the power supply line 263, through which power is supplied to the entire MFP 100. In the sleep mode, power is supplied to only the power supply line 262, through which power is supplied to only the entire NIC 101 and the RAM 222 and the operation unit I/F 225 within the MFP 100, which results in a considerable reduction in power consumption. For wake-up from the sleep mode, the CPU 201 of the NIC 101 gives a normal power-on instruction (return command) to the power ON/OFF unit 261 using a power control signal 265 so as to resume power supply to the entire MFP 100, through which the power state can return to the normal power state. In other words, the standby state is a first power state in which power is supplied to the CPU 221 and the NIC 101, and the sleep mode is a second power state in which power is supplied to the NIC 101 but not supplied to the CPU 221. However, where power is supplied to in the respective power states can be changed, as long as power consumption in the second power state is lower than that in the first power state.

Software Configuration

Figure 3:
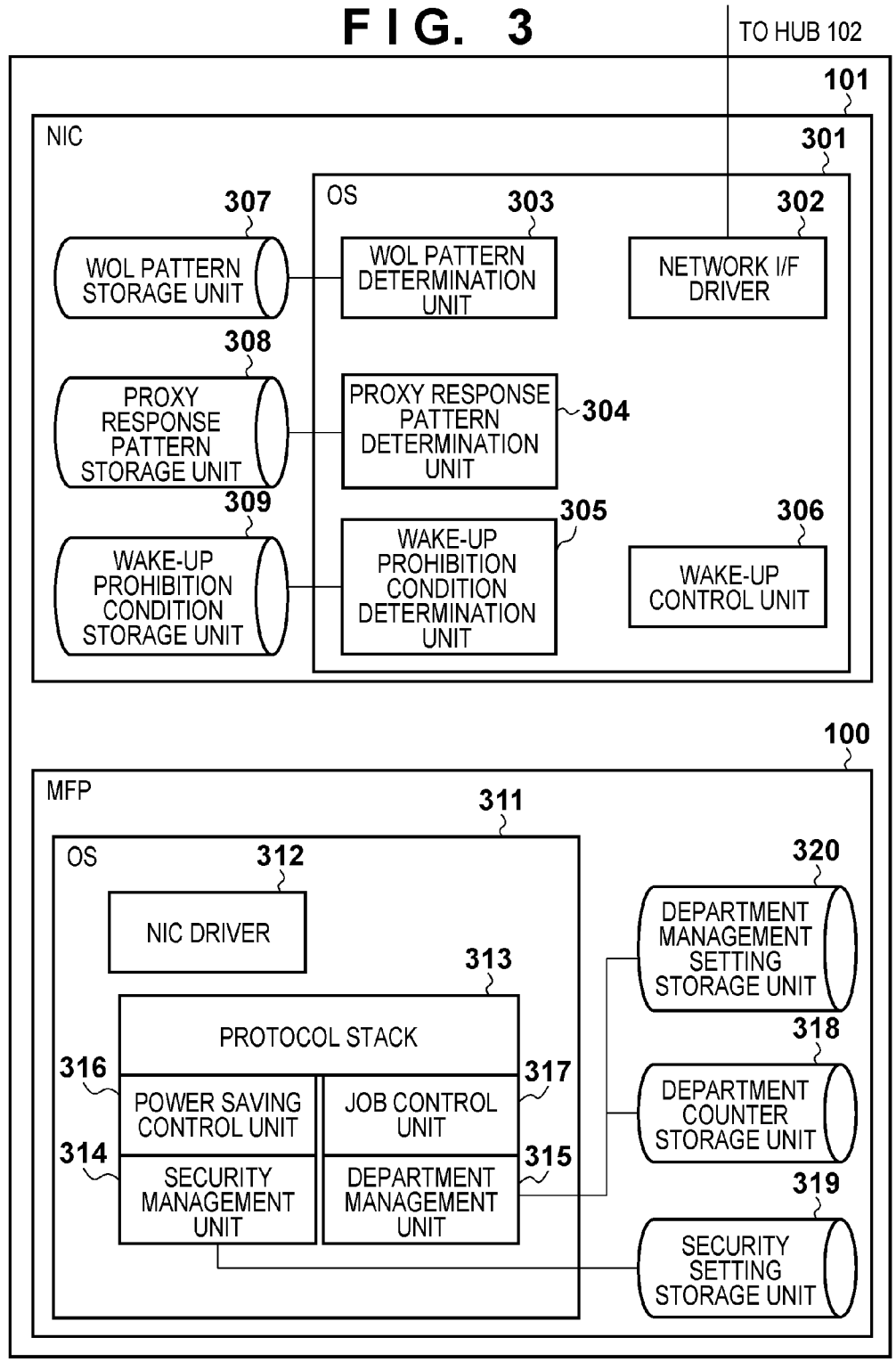
FIG. 3 shows a software configuration of an NIC 101 and an MFP 100.

Next, a software configuration of the NIC 101 and the MFP 100 will be described with reference to FIG. 3. Note that the following description mainly focuses on the primary part of the software configuration of the NIC 101 and the MFP 100 of the present invention, that is, the configuration thereof regarding power saving control. However, the NIC 101 and the MFP 100 may include various types of software other than the software described below. Each piece of the software shown in FIG. 3 is stored in the memory of the NIC 101 or the MFP 100, and is executed by the CPU of the NIC 101 or the MFP 100 by being loaded in the RAM in response to activation of the NIC 101 or the MFP 100.

An operating system (OS) 301 on the NIC 101 side includes a network I/F driver 302, a WOL (Wakeup on LAN) pattern determination unit 303, a proxy response pattern determination unit 304, a wake-up prohibition condition determination unit 305, and a wake-up control unit 306. Programs for these units are stored in the ROM 203 and executed using the RAM 202 as a work area. The network I/F driver 302 controls execution of the communication processing performed by the network I/F 204. The various determination units including the WOL pattern determination unit 303, the proxy response pattern determination unit 304, and the wake-up prohibition condition determination unit 305 perform their respective determination processing on a packet received by the NIC 101 during the sleep mode.

The WOL pattern determination unit 303 determines whether or not the packet received by the NIC 101 during the sleep mode matches a packet pattern registered in a WOL pattern storage unit 307 reserved in the ROM 203. Packet patterns registered in the WOL pattern storage unit 307 are called WOL packets, and a packet that matches a WOL packet is determined as a packet that requires the MFP 100 to be waked up from the sleep mode. If the received packet has been determined as a WOL packet and if that packet is not determined as a wake-up prohibition packet by the wake-up prohibition condition determination unit 305, which will be described later, the wake-up control unit 306 causes the MFP 100 to return from the sleep mode.

The wake-up control unit 306 gives a normal power-on instruction (return command) to resume power supply to the CPU 221 and the like of the MFP 100, to the power ON/OFF unit 261. The proxy response pattern determination unit 304 determines whether or not the received packet is a packet for which the NIC 101 can make a response by itself during the sleep mode without waking up the MFP 100 from the sleep mode.

Specifically, the proxy response pattern determination unit 304 determines whether or not the packet received by the NIC 101 during the sleep mode matches a packet pattern registered in a proxy response pattern storage unit 308 reserved in the ROM 203. If the received packet has matched a packet pattern, a response packet associated with that proxy response pattern is transmitted by controlling the network I/F driver 302. The function of the proxy response is not a primary feature of the present invention and thus a detailed description thereof has been omitted.

The wake-up prohibition condition determination unit 305 determines whether or not the packet received by the NIC 101 during the sleep mode is a packet that matches a wake-up prohibition condition. wake-up prohibition conditions as used herein refer to conditions for prohibiting a return from the sleep mode to the standby state. If the received packet is a packet that matches a wake-up prohibition condition registered in the wake-up prohibition condition storage unit 309, the sleep mode is maintained without a wake-up instruction being given to the wake-up control unit 306, even if the WOL pattern determination unit 303 has determined the received packet as a WOL packet. The details of the wake-up prohibition condition determination unit 305 will be described later.

Meanwhile, an operating system (OS) 311 on the MFP 100 side includes an NIC driver 312, a protocol stack 313, a security management unit 314, a department management unit 315, a power saving control unit 316, and a JOB control unit 317. The NIC driver 312 transmits various instructions to the NIC 101 and causes the NIC 101 to execute various operations such as packet transmission and reception. The protocol stack 313 is where a communication protocol such as TCP/IP is processed. The protocol stack 313 performs processing such as converting data transferred from an upper-layer application into packets and transferring these packets to the NIC driver 312, or, conversely, receiving packets received by the NIC driver 312 and transferring the packet data to an upstream application. The security management unit 314 and the security setting storage unit 319 will be described later in a second embodiment, and therefore descriptions thereof have been omitted here.

Next is a description of a department management unit 315. Note that a department management function is the function of managing the upper limit number of sheets that can be copied or printed for each ID, called a "department ID", that identifies a user or a group, or managing restrictions on functions such as restricting a specific function. The present embodiment describes an example in which wake-up prohibition conditions are set using the department management function. However, the present invention is not intended to be limited to the case of setting wake-up prohibition conditions using the department management function, and wake-up prohibition conditions may be arbitrarily set in accordance with the usage environment in which the MFP 100 has been installed.

The department management unit 315 performs processing for storing department management settings set by a user through the operation unit 230 in a department management setting storage unit 320 reserved in the ROM 223 of the MFP 100. The department management unit 315 also gives an instruction to prohibit the use of a function targeted for prohibition to the JOB control unit 317, which will be described later, in accordance with the setting information stored in the department management setting storage unit 320. An example of the setting information set in the department management setting storage unit 320 will be described in detail later with reference to FIG. 5. The department management unit 315 is further notified of count information at a time when the JOB control unit 317 outputs a page during JOB processing such as copying or printing. In accordance with the count information notified from the JOB control unit 317, the department management unit 315 also performs processing on the department counter storage unit 318, for incrementing an output sheet counter for the corresponding department ID. The count information stored in the department counter storage unit 318 will be described in detail later with reference to FIG. 6.

Next is a description of the power saving control unit 316. The power saving control unit 316 performs control such as causing the MFP 100 to transition to the sleep mode or return to the standby state. The power saving control unit 316 performs control to monitor the usage status of the operation unit 230 of the MFP 100 or the operating status of the JOB control unit 317 described later, and if having determined that the standby state of the MFP 100 has remained unchanged, cause the MFP 100 to transition to the sleep mode. In the case of causing the MFP 100 to transition to the sleep mode, the power saving control unit 316 performs control to stop power supply to all units except specific units, and thereby reduces power consumption. The power saving control unit 316 further performs control to stop the CPU 221, set the RAM 222 to a low-power state (self-refresh mode), and stop software being executed by the MFP 100. In the case where a normal power-on instruction to return has been received from the NIC 101 during the sleep state or where an interrupt has occurred as a result of a switch being pressed on the operation unit 230, the power saving control unit 316 also performs standby transition control in which the CPU 221 resumes operation and power supply to the respective units is resumed.

Next is a description of the JOB control unit 317. For example, when an operation such as copying has been performed through the operation unit 230, the JOB control unit 317 accepts a task (hereinafter referred to as a "JOB") instructed for the JOB control unit 317 and performs processing by controlling the scanner 240 or the printer 250. A print request received by the NIC 101 and data regarding such a request (which is hereinafter referred to as a "print JOB") are also passed to the JOB control unit 317 via the protocol stack 313. The JOB control unit 317 interprets the content of the JOB, controls the printer 250, and performs designated print control.

Sleep Control

Next, sleep control using the wake-up prohibition conditions according to the present embodiment will be described with reference to FIG. 4. Overall control of the processing described below is performed by the CPU 221 of the MFP 100 or the CPU 201 of the NIC 101. Note that the following describes the example of conditions for department management as wake-up prohibition conditions for prohibiting wake-up from the sleep mode. However, the present invention is not intended to limit the wake-up prohibition conditions for prohibiting wake-up from the sleep mode to the aforementioned conditions for department management, and arbitrary conditions can be set as the wake-up prohibition conditions.

First, in step S401, the power saving control unit 316 determines whether or not the transition to the sleep mode is possible, by determining whether or not a condition for causing the MFP 100 to transition to the sleep mode is satisfied. If such a condition for permitting the transition to the sleep mode is satisfied, the processing proceeds to step S402, in which the power saving control unit 316 performs sleep-mode transition processing. Specifically, the power saving control unit 316 performs power control such as stopping power supply to the display unit of the operation unit 230 and stopping power supply to the scanner 240 and the printer 250 of the MFP 100. Note that the condition for permitting the transition to the sleep mode as used herein refers to, for example, the case where the image forming system 200 has been in a state of not receiving a job for a certain period of time.

Next, in step S403, the power saving control unit 316 instructs the security management unit 314 or the department management unit 315 to generate wake-up prohibition conditions. Upon receiving the instruction, the security management unit 314 and the department management unit 315 generate wake-up prohibition conditions in accordance with their respective management states. In the present embodiment, generation of the wake-up prohibition conditions for department management will be described in detail later with reference to FIGS. 5 to 7.

Then, in step S404, the NIC driver 312 notifies the NIC 101 side of the generated wake-up prohibition conditions. Meanwhile, in step S405, the wake-up prohibition condition determination unit 305 writes the wake-up prohibition conditions notified from the MFP 100 to the wake-up prohibition condition storage unit 309. The wake-up conditions written to the wake-up prohibition condition storage unit 309 are temporarily stored in the RAM 202 of the NIC 101. After the wake-up prohibition conditions have been notified, the power saving control unit 316 gives a sleep-mode instruction to the NIC 101 in step S406. Thereafter, in step S408, the power saving control unit 316 causes the RAM 222 to transition from the normal state to the low-power state and stops the CPU 221, thus completing the transition to the sleep mode. In step S407, upon receiving the sleep-mode instruction, the wake-up control unit 306 starts sleep-mode processing.

After the transition to the sleep mode, this sleep mode will be maintained until an event causing the MFP 100 to return from the sleep mode to the standby state occurs. In step S409, the network I/F driver 302 determines whether or not a packet to its own apparatus, i.e., the image forming system 200, has been received. If it is determined that such a packet has been received, the packet received on the network I/F 204 within the NIC 101 is stored in the RAM 202 of the NIC 101. The processing further proceeds to step S410, in which the WOL pattern determination unit 303 determines whether or not the received packet is a WOL packet. In other words, the WOL pattern determination unit 303 determines whether or not a WOL pattern has been detected from the received packet.

If it is determined that a WOL packet has been received, the processing proceeds to step S411, in which the wake-up prohibition condition determination unit 305 executes determination processing for determining whether or not that WOL packet matches a wake-up prohibition condition registered in the wake-up prohibition condition storage unit 309. Then, whether or not the WOL packet matches a wake-up prohibition condition is determined in step S412. The determination processing for determining whether or not the packet matches a wake-up prohibition condition will be described in detail later with reference to FIGS. 8 and 9. If the packet does not match a wake-up prohibition condition, the processing proceeds to step S414, in which the wake-up control unit 306 gives a normal power-on instruction to the power ON/OFF unit 261 so as to wake up the MFP 100. If a WOL pattern has not been detected from the received packet or if the WOL packet matches a wake-up prohibition condition, the processing proceeds to step S413, in which the proxy response pattern determination unit 304 determines whether or not the received packet matches a proxy response pattern. Here, the network I/F driver 302 transmits a response to a packet for which a proxy response is possible. On the other hand, if the received packet is not a packet for which proxy response is possible, the proxy response pattern determination unit 304 discards the received packet.

When the wake-up control unit 306 gives a normal power-on instruction to the power ON/OFF unit 261, the power saving control unit 316 cancels the sleep mode in step S415. Specifically, upon receiving a normal power-on instruction from the NIC 101, the power ON/OFF unit 261 starts conducting power to the power supply line 263. Accordingly, the CPU 221 resumes operation. When the CPU 221 resumes operation, the RAM 222 returns from the low-power state to the normal state, and the power saving control unit 316 performs sleep return processing. Then, the packet that triggered the cancellation of the sleep mode and a packet subsequently received by the NIC 101 are transferred to the MFP 100. In the MFP 100, the protocol stack 313 passes the packets received from the NIC 101 to the JOB control unit 317. Then, in step S416, the JOB control unit 317 performs JOB processing in accordance with the contents of the received packets.

Generation of Wake-Up Prohibition Conditions

Figure 4:
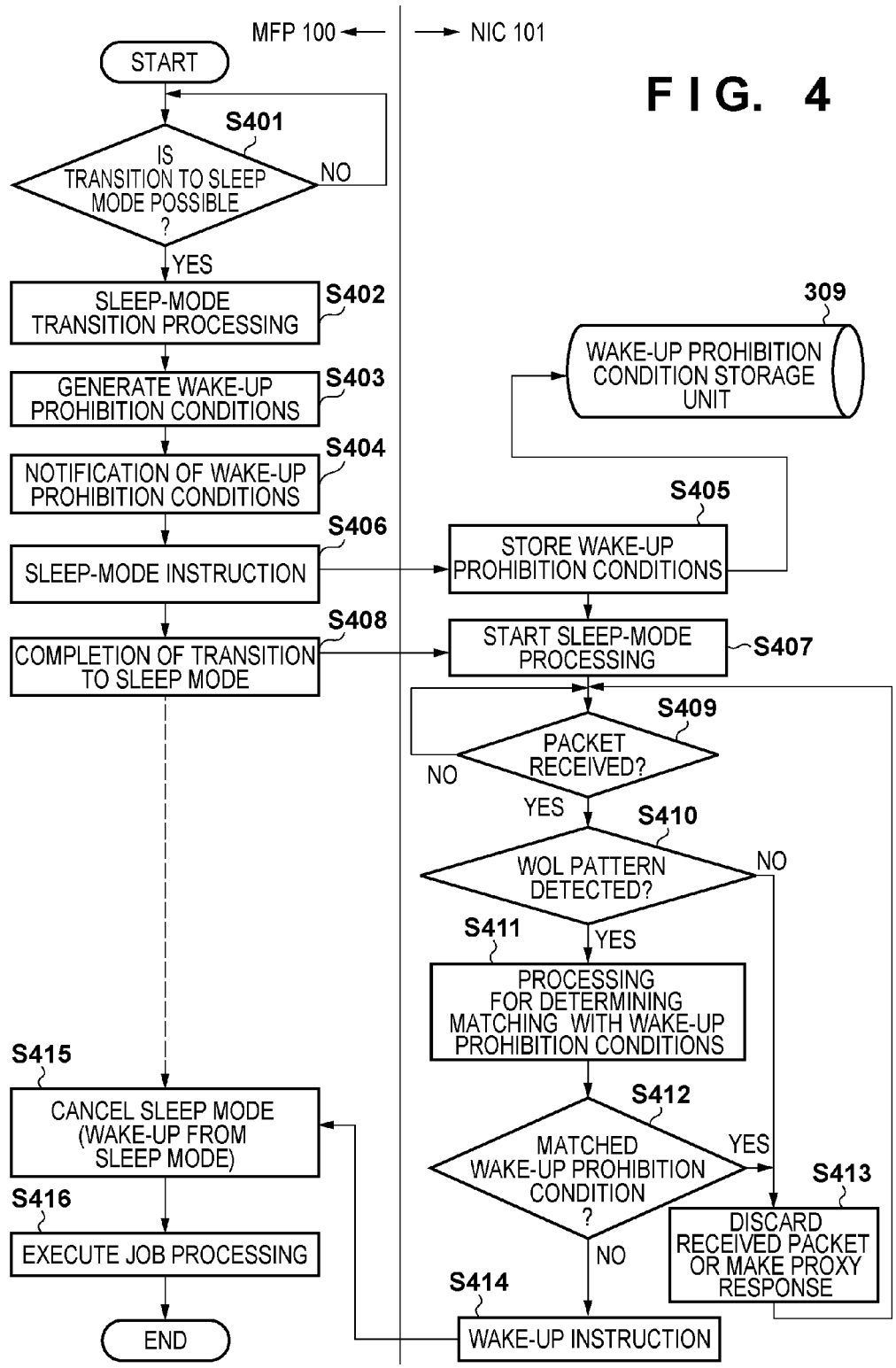
FIG. 4 is a flowchart showing the procedure of processing for notifying sleep-mode wake-up prohibition conditions and determining whether or not to prohibit wake-up, performed from a transition to the sleep mode to a return from the sleep mode.

The description thus far has focused on the transition from the standby state to the sleep mode and the return from the sleep mode to the standby state with reference to FIG. 4. The following description further clarifies the generation of the wake-up prohibition conditions for department management with reference to FIGS. 5 to 7. First, department management settings and department counters will be described with reference to FIGS. 5 and 6. The department management settings and the department counters are information pieces that are necessary when generating wake-up prohibition conditions based on department management. FIG. 5 shows an example of department-management setting information set in the department management setting storage unit 320.

Department-management setting information 500 is constituted from Section ID 501, Copy Limit Count 502, Print Limit Count 503, Color Job 504, Single Side Job 505, Not N-in-1 Job 506, and Clear Timing 507. Section ID 501 indicates a department ID that identifies each department. The upper limit number of sheets that can be copied for each department ID is set in Copy Limit Count 502. In the example in FIG. 5, the upper-limit number of sheets that can be copied for the department with the department ID of "2" is set to 2000 sheets per week.

The upper limit number of sheets that can be printed for each department ID is set in Print Limit Count 503. In FIG. 5, the upper-limit number of sheets that can be printed for the department with the department ID of "3" is set to 5000 sheets per week. The upper limit number of sheets that can be output in color copying or color printing is set in Color Job 504. In FIG. 5, the upper-limit number of sheets that can be output for the department with the department ID of "2" is set to 1000 sheets per per week. Whether to permit or prohibit single-side copying or printing is set in Single-Side Job 505. In FIG. 5, this setting for the department with the department ID of "1" is that a single-side job is prohibited.

Whether to permit or prohibit a job other than paper-saving jobs, called for example 2-in-1 or 4-in-1, in which a plurality of pages are output on a single sheet is set in Not N-in-1 Job 506. In FIG. 5, this setting for the department with the department ID of "1" is that a job other than paper-saving jobs such as 2-in-1 or 4-in-1 is prohibited. When to clear the sheet counts is set in Clear Timing 507. In FIG. 5, the counts are set to be cleared at 00:00 every Sunday.

As in the example of the department management setting storage unit 320 in FIG. 5, the upper-limit values for each job type and permit/prohibit setting are set in detail for each department, and this department management setting storage unit 320 is referenced to make a determination when restricting the number of sheets that can be output for each department or performing processing for prohibiting a job. Next, an example of department counter information stored in the department counter storage unit 318 will be described with reference to FIG. 6.

Department counter information 600 is constituted from Section ID 601, Color Copy 602, Mono Copy 603, Color Print 604, and Mono Print 605. Section ID 601 indicates a department ID that identifies each department. Color Copy 602 indicates a value obtained by counting the number of color-copied sheets output from each department. Mono Copy 603 indicates a value obtained by counting the number of monochrome-copied sheets output from each department. Color Print 604 indicates a value obtained by counting the number of color-printed sheets output from each department. Mono Print 605 indicates a value obtained by counting the number of monochrome-printed sheets output from each department.

As in the example of the department counter storage unit 318 in FIG. 6, the numbers of output sheets for each department are managed by counting the numbers of output sheets obtained by color/monochrome copying/printing for each department. For example, when a user belonging to the department with the department ID of "1" performs color copying, the JOB control unit 317 notifies the department management unit 315 to increment the color copy count every time paper is output. Upon receiving such an instruction to increment the count, the department management unit 315 increments the counter value of Color Copy 602 for the department with the department ID of 1, which is executing the job. Then, after having incremented the counter value, the department management unit 315 determines whether or not the counter value has reached the upper-limit value, by referencing the aforementioned department-management setting information 500. If the counter value has reached the upper-limit value, the department management unit 315 gives an instruction to prohibit the job type whose upper limit value has been reached, to the JOB control unit 317.

Next, the processing for generating wake-up prohibition conditions based on department management will be described with reference to the aforementioned department-management setting information 500 stored in the department management setting storage unit 320 and the aforementioned department counter information 600 stored in the department counter storage unit 318. First, the department management unit 315 acquires the upper limit value for each job type for each department from the department-management setting information 500, and acquires the counter value for each job type for each department from the department counter information 600. Then, the department management unit 315 extracts a department ID and job type whose counter value has reached the upper-limit value. For example, in the example of the department counter information 600 in FIG. 6, the number of printed sheets obtained by adding the counter value of Color Print 604 and the counter value of Mono Print 605 for the department with the department ID of "2" has reached 2000. Therefore, this value matches the value of 2000/week set in Print Limit Count 503 for the department with the department ID of "2" in the department-management setting information in FIG. 5. Accordingly, printing for the department with the department ID of 2 is determined to be prohibited, and a wake-up prohibition condition based on this determination result is temporarily stored in the RAM 222 of the MFP 100. Results obtained by generating the wake-up prohibition conditions based on department management in this manner are described below with reference to FIG. 7.

Figures 7, 8:
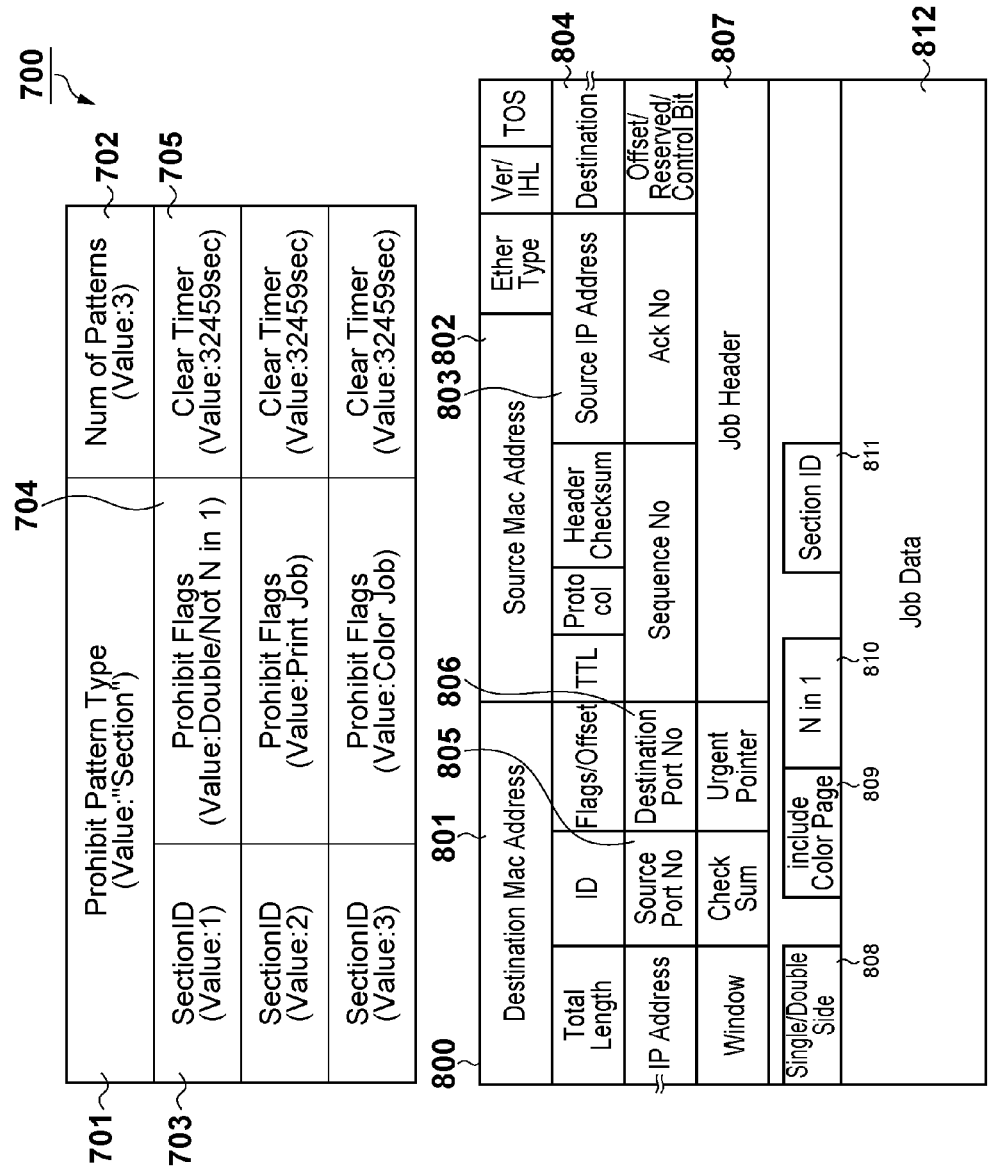
FIG. 7 shows an example of a sleep-mode wake-up prohibition condition table for department management according to the first embodiment.
FIG. 8 shows an exemplary internal configuration of a received packet.

FIG. 7 shows an example of the wake-up prohibition conditions based on department management. A wake-up prohibition condition table 700 for department management is constituted from Prohibit Pattern Type 701, Num of Patterns 702, Section ID 703, Prohibit Flags 704, and Clear Timer 705. A value indicating the type of the wake-up prohibition conditions in the wake-up prohibition condition table is set in Prohibit Pattern Type 701. In the case of department management, a value of "Section" is set to indicate that the wake-up prohibition conditions in the table are based on department management.

A numerical value indicating the number of wake-up prohibition conditions is set in Num of Patterns 702. If the table contains three wake-up prohibition conditions, the value of 3 is set in Num of Patterns 702. Section ID 703 is a value indicating the department ID, in which a department ID as a wake-up prohibition target is set. Prohibit Flags 704 indicates a job type with which wake-up is prohibited for the department ID. For example, in FIG. 7, the job type with which wake-up is prohibited for the department with the section ID of "2" is "Print Job", which indicates a setting in which wake-up is prohibited even if a packet regarding a print job is received from the department with the section ID of "2".

Clear Timer 705 indicates the time to clear the wake-up prohibition condition (to delete the wake-up prohibition condition from among prohibition conditions). Because there are cases where the NIC 101 is not provided with a device such as an RTC for acquiring the time, the time to clear the wake-up prohibition condition is designated in units of seconds so that the time elapsed can be determined by only the CPU 201 of the NIC 101. In FIG. 7, the time interval in seconds until the time to clear the wake-up prohibition condition is set and notified to the NIC 101 side. The time interval in seconds is calculated by obtaining a difference between the time set in Clear Timing 507 in the department-management setting information shown in FIG. 5 and the time acquired by an RTC device (not shown) provided on the MFP 100 side and converting the difference to seconds.

Processing for Determining Matching with Wake-Up Prohibition Conditions

Figure 9:
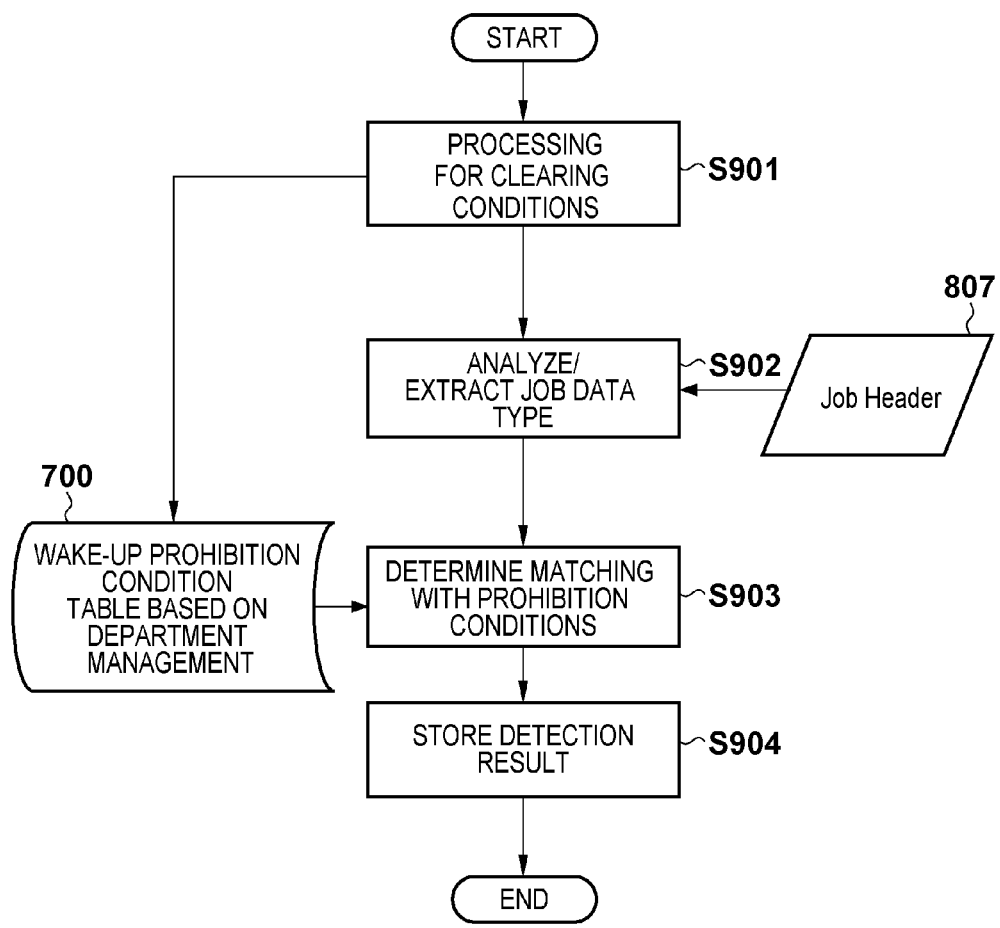
FIG. 9 is a flowchart showing the procedure for determining matching with sleep-mode wake-up prohibition conditions.

Next, the processing performed on the NIC 101 side for determining whether or not there is a match with a wake-up prohibition condition will be described with reference to FIGS. 8 and 9. FIG. 8 shows an example of a packet regarding a print job and including the department ID, received by the NIC 101 during the sleep mode.

A packet 800 shown in FIG. 8 includes various parameters 801 to 811, header information necessary for communication that includes, for example, an Ethernet (registered trademark) header, an IP header, and a TCP header, and job data 812. Here, as one example, a description is given of only a portion relating to the department ID and the job type information. In the case of a print job, the packet 800 includes Job Header 807 indicating the attribute of the print job or the like, after various communication headers. Various attributes are embedded in Job Header 807. Examples of the attributes embedded in Job Header 807 include Single/Double Side 808 serving as an attribute indicating whether single side or double side is designated, Include Color Page 809 serving as an attribute indicating whether or not color pages are included, N-in-1 810 serving as an attribute indicating whether or not printing of a plurality of pages on a single sheet is designated, and Section ID 811 indicating the department ID.

In the processing for determining whether or not to match a wake-up prohibition condition, these attributes included in Job Header 807 in the received packet are referenced to determine whether or not that packet matches a wake-up prohibition condition. Next, the processing for determining whether or not to match a wake-up prohibition condition by referencing Job Header 807 will be described with reference to FIG. 9. FIG. 9 shows the procedure for the processing for determining whether or not a print job with the department ID received by the NIC 101 during the sleep mode matches a wake-up prohibition condition. This procedure corresponds to the internal procedure performed in step S411 in FIG. 4. Note that overall control of the processing described below is performed by the CPU 201 of the NIC 101.

First, in step S901, before checking whether or not the received packet matches a wake-up prohibition condition, the wake-up prohibition condition determination unit 305 checks whether or not the wake-up prohibition condition table based on department management contains an entry whose time for clearing has already been reached. The wake-up prohibition condition determination unit 305 further performs processing for deleting an entry whose time has expired from among the checked entries. Specifically, if the time interval in seconds elapsed since the NIC 101 starts to operate in the sleep-mode exceeds the time set in Clear Timer 705, the wake-up prohibition condition determination unit 305 deletes that entry from the wake-up prohibition condition table 700.

Next, in step S902, the wake-up prohibition condition determination unit 305 references Job Header 807 in the received packet 800 and extracts attributes that are necessary to analyze the job type and compare the packet with the wake-up prohibition condition. Although already described with reference to FIG. 8, Job Header 807 includes attributes such as Single/Double Side 808, Include Color Page 809, N-in-1 810, and Section ID 811. By referencing theses attributes, the wake-up prohibition condition determination unit 305 can extract the attributes necessary for the comparison.

In step S903, the wake-up prohibition condition determination unit 305 compares the attribute information extracted in step 902 and the wake-up prohibition condition table 700 and determines whether or not the print job matches a wake-up prohibition condition. For example, if the value set in Section ID 811 in the received packet 800 is "1", the wake-up prohibition condition determination unit 305 searches for Section ID 703 that matches "1" from among the three entries in the wake-up prohibition condition table in FIG. 7. Then, the wake-up prohibition condition determination unit 305 compares the prohibition flags designated by Prohibit Flags 704 of the entry having the matched Section ID, with the contents of the attributes included in Job Header 807, namely, N-in-1 810, Single/Double Side 808, and Include Color Page 809. Through this, it is possible to check the presence or absence of an attribute value that matches a wake-up prohibition condition. If an attribute value that matches a wake-up prohibition condition has been detected, it is determined that the print job matches the wake-up prohibition condition.

Then, in step S904, the wake-up prohibition condition determination unit 305 stores the determination result in the work memory in the RAM 202 of the NIC 101, and ends a single process performed on a received packet. Subsequent processing is as described with reference to FIG. 4, in which a wake-up instruction is not given if a match has been detected, in order to reduce the number of unnecessary returns from the sleep mode.

Second Embodiment

Next, a second embodiment will be described with reference to FIGS. 10 to 12. While the first embodiment describes the power saving control in accordance with the state of department management, the second embodiment describes power saving control in accordance with the state of security management. Note that descriptions of the configuration of the communication system including the image forming system and the configuration of the image forming system have been omitted due to being the same as in the first embodiment. The same applies to the software configuration in FIG. 3, which has already been described in the first embodiment, but an additional description will be given regarding the security management unit 314, which is the feature of the second embodiment.

The security management unit 314 operates in the operating system (OS) 311 on the MFP 100 side in FIG. 3. The security management unit 314 performs processing for managing security for communication. Specifically, for example, the security management unit 314 performs processing for storing security settings set by a user through the operation unit 230 in the security setting storage unit 319 reserved in the ROM 223 of the MFP 100. Furthermore, the security management unit 314 also performs security processing such as prohibiting reception of jobs from a PC that delivers a DOS (Denial of Services) attack that involves continually transmitting print jobs to the image forming system 200 and causing paper to run out. The security management unit 314 also stores information regarding a PC that is determined as being the source of a DOS attack in the security setting storage unit 319 reserved in the ROM 223 of the MFP 100.

When the MFP 100 operates in the standby state, the security management unit 314 instructs the NIC driver 312 and the protocol stack 313 to perform filtering in accordance with the security settings stored in the security setting storage unit 319, and blocks packets that correspond to the security settings. In the power saving control for security management, the procedure for sleep control processing using the wake-up prohibition conditions performed when the MFP 100 transitions to the sleep mode or returns from the sleep mode is also basically the same as the flowchart in FIG. 4. However, the processing for generating wake-up prohibition conditions (step S303) and the wake-up prohibition conditions to be notified to the NIC 101 side are in accordance with security management, and therefore, descriptions thereof will be given below with reference to FIGS. 10 and 11.

FIG. 10 shows an example of security setting information set in the security setting storage unit 319. Security setting information 1000 includes ID 1001, Source MAC Address 1002, Source IP Address 1003, and Destination Port 1004. The ID 1001 indicates an entry ID for security setting, and is used to identify each security setting.

The MAC address of a packet transmission source from which the reception of packets is to be blocked, is registered in Source MAC Address 1002. In the example shown in FIG. 10, a value indicating the MAC address "00:00:01:23:45:67" is registered for ID 2. This registration indicates that packets from the transmission source with the MAC address "00:00:01:23:45:67" are prohibited from being received. If no address is set in Source MAC Address 1002, the MAC address of the transmission source is not checked. The IP address of the transmission source from which the reception of packets is to be blocked is registered in Source IP Address 1003. In the example shown in FIG. 10, the IP address "192.168.1.214" is registered for ID 1. This registration indicates that packets from the transmission source with the IP address "192.168.1.214" are prohibited from being received. If no address is set in Source IP Address 1003, the IP address of the transmission source is not checked.

A TCP destination port number from which the reception of packets is to be blocked is registered in Destination Port 1004. In the example of FIG. 10, the port number "9100" is registered for ID 3. This registration indicates that packets from the destination port number of 9100 are prohibited from being received. If no port number is set in Destination Port 1004, the destination port number is not checked. For ID 3, the IP address of the transmission source is also registered. Thus, this registration indicates that packets from the transmission source of "192.168.1.118" and to the destination port of "9100" are prohibited from being received. Registering such combinations of the IP address and the port number makes it possible to guard against the aforementioned DOS attack using print jobs.

This security setting information 1000 is referenced when generating the wake-up prohibition conditions based on security management. Next, information for notifying the NIC 101 side of the wake-up prohibition conditions generated based on security management will be described with reference to FIG. 11. A wake-up prohibition condition table 1100 based on security management includes Prohibit Pattern Type 1101, Num of Patterns 1102, Source MAC Address 1103, Source IP Address 1104, and Destination Port 1105.

A value indicating the type of wake-up prohibition conditions in the wake-up prohibition condition table is set in Prohibit Pattern Type 1101. In the case of security management, a value of "Network Security" is set to indicate that the wake-up prohibition conditions in the table are based on security management. A numerical value indicating the number of wake-up prohibition conditions is set in Num Of Patterns 1102. If the table contains three wake-up prohibition conditions, a value of "3" is set in Num Of Patterns 1102.

Source MAC Address 1103 indicates the MAC address of the transmission source with which wake-up is prohibited. For example, in the example of FIG. 11, the address "00:00:01:23:45:67" is set in the second entry. This setting indicates that wake-up upon receipt of packets from this MAC address is prohibited. Source IP Address 1104 indicates the IP address of the transmission source with which wake-up is prohibited. For example, in the example of FIG. 11, the address "192.168.1.214" is set in the first entry. This setting indicates that wake-up upon receipt of packets from this IP address is prohibited.

Destination Port 1105 indicates the destination port number with which wake-up is prohibited. For example, in the example of FIG. 11, the port number "9100" is set in the third entry. This setting indicates that wake-up upon receipt of packets with this destination port number is prohibited. The above has been a description of the operation for generating the sleep-mode wake-up prohibition conditions based on security management with reference to FIGS. 10 and 11.

Figure 12:
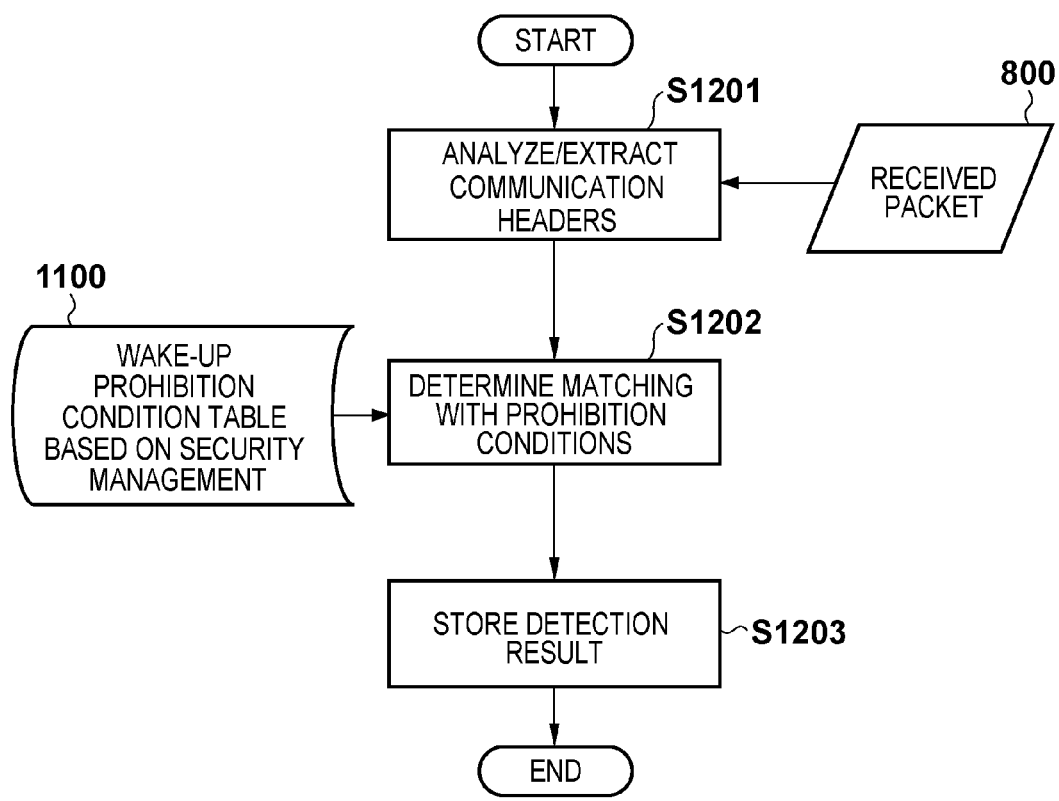
FIG. 12 is a flowchart showing the procedure for determining matching with sleep-mode wake-up prohibition conditions for security management according to the second embodiment.

The following is a description of processing for determining whether or not the received packet matches a wake-up prohibition condition, performed on the NIC 101 side after the start of the sleep mode upon notification of the generated wake-up prohibition conditions to the NIC 101 side, with reference to FIGS. 8 and 12. The packet 800 shown in FIG. 8 also describes header information regarding a print job, in addition to the header information necessary for communication such as the Ethernet (registered trademark) header, the IP header, and the TCP header. The following description focuses on only communication addresses and communication ports relating to information that is necessary when determining whether or not there is a match with a wake-up prohibition condition in security management, which is a feature of the second embodiment.

At the top of the received packet 800 is the Ethernet (registered trademark) header that includes the destination/transmission source addresses at the MAC layer, namely, Destination MAC Address 801 and Source MAC Address 802. Following the Ethernet (registered trademark) header is the IP header that includes the destination/transmission source addresses at the IP layer, namely, Source IP Address 803 and Destination IP Address 804. Following the IP header is the TCP header that includes the communication ports at the TCP layer, namely, Source Port No. 805 and Destination Port No. 806. By referencing and extracting these address information and port information, the aforementioned processing for determining whether or not to match a wake-up prohibition condition in FIG. 11 is performed.

Next, the processing performed in security management for determining whether or not to match a wake-up prohibition condition by referencing the address information and the port information of the received packet will be described in more detail with reference to FIG. 12. FIG. 12 shows the procedure for the processing for determining whether or not the packet received by the NIC 101 during the sleep mode matches a wake-up prohibition condition based on security management. This processing corresponds to the internal procedure performed in step S411 in FIG. 4. Note that overall control of the processing described below is performed by the CPU 201 of the NIC 101.

In step S1201, the wake-up prohibition condition determination unit 305 references, for example, Source MAC Address 802, Source IP Address 803, and Destination Port No 806 in the received packet 800. The wake-up prohibition condition determination unit 305 further extracts the address information and the port information that are necessary for comparison with the wake-up prohibition conditions. Next, in step S1202, the wake-up prohibition condition determination unit 305 compares the address information and the port information extracted in step S1201 with the wake-up prohibition condition table 1100 and determines whether or not the received packet matches a wake-up prohibition condition. Then, in step S1203, the wake-up prohibition condition determination unit 305 stores the determination result in the work memory in the RAM 202 of the NIC 101, which completes a single process to be performed on the received packet. Subsequent processing is as already described in the processing of step S142 onward in the flowchart of FIG. 4, in which even if the packet is a WOL packet, a wake-up instruction is not given if matching has been detected from the determination result, in order to reduce the number of unnecessary returns from the sleep mode.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-064826 filed on Mar. 23, 2011, which is hereby incorporated by reference herein in its entirety.

What is claimed is:

1. An information processing apparatus comprising an interface unit that controls communication with an external apparatus and having a first power state and a second power state in which power consumption is lower than in the first power state and power is supplied to at least the interface unit, the apparatus comprising:
a generation unit that generates, in the first power state, a prohibition condition for prohibiting the information processing apparatus from returning from the second power state to the first power state even if the interface unit receives data from the external apparatus in the second power state and the received data matches a return condition for causing the information processing apparatus to return from the second power state to the first power state;
a notification unit that notifies, in the first power state, the interface unit of the prohibition condition generated by the generation unit; and
a power control unit that, upon receiving a return command indicating a return from the second power state to the first power state from the interface unit after the information processing apparatus transits from the first power state to the second power state, causes the information processing apparatus to return from the second power state to the first power state,
wherein in a case where data is received from the external apparatus in the second power state and the received data matches the return condition, if the received data matches the prohibition condition, the interface unit does not transmit the return command to the power control unit, and if the received data does not match the return condition, the interface unit transmits the return command to the power control unit.

2. The information processing apparatus according to claim 1,
wherein the interface unit comprises a determination unit that determines whether or not the data received from the external apparatus matches the return condition, and
if it is determined that the data received from the external apparatus matches the return condition, the interface unit determines whether or not the received data matches the prohibition condition.

3. The information processing apparatus according to claim 1, wherein the interface unit comprises a response unit that responds to the external apparatus in a case where the return command is not transmitted to the power control unit even if data is received from the external apparatus.

4. The information processing apparatus according to claim 1, further comprising:
a department management unit that manages use of the information processing apparatus for each user or for each department,
wherein the generation unit generates the prohibition condition using information managed by the department management unit.

5. The information processing apparatus according to claim 4, wherein the interface unit determines whether or not information regarding a job included in the data received from the external apparatus matches the prohibition condition.

6. The information processing apparatus according to claim 1, further comprising:
a security management unit that manages security for communication between the information processing apparatus and the external apparatus,
wherein the generation unit generates the prohibition condition using information managed by the security management unit.

7. The information processing apparatus according to claim 6, wherein the interface unit determines whether or not information regarding a transmission source of the data received from the external apparatus matches the prohibition condition.

8. A method for controlling an information processing apparatus comprising an interface unit that controls communication with an external apparatus and having a first power state, and a second power state in which power consumption is lower than in the first power state and power is supplied to at least the interface unit, the method comprising:
- generating, in the first power state, a prohibition condition for prohibiting the information processing apparatus from returning from the second power state to the first power state even if the interface unit receives data from the external apparatus in the second power state and the received data matches a return condition for causing the information processing apparatus to return from the second power state to the first power state;
- notifying, in the first power state, the interface unit of the prohibition condition generated in the generation step;
- transmitting, in a case where data is received from the external apparatus in the second power state, and the received data matches the return condition and does not match the prohibition condition, from the interface unit a return command indicating a return from the second power state to the first power state;
- upon receiving the return command from the interface unit, causing the information processing apparatus to return from the second power state to the first power state,
- wherein in a case where data is received from the external apparatus in the second power state, and the received data matches the return condition and the prohibition condition, the interface unit does not transmit the return command to the power control unit.

9. A non-transitory computer-readable storage medium storing a computer program for causing a computer to execute the steps of the method for controlling an information processing apparatus according to claim 8.

* * * * *